UNITED STATES PATENT OFFICE.

CARLETON ELLIS, OF MONTCLAIR, AND HARRY M. WEBER, OF BLOOMFIELD, NEW JERSEY, ASSIGNORS TO ELLIS-FOSTER COMPANY, A CORPORATION OF NEW JERSEY.

PROCESS OF MAKING ARTIFICIAL RESINS.

1,381,863.     Specification of Letters Patent.     Patented June 14, 1921.

No Drawing.     Application filed October 2, 1920. Serial No. 414,279.

*To all whom it may concern:*

Be it known that we, CARLETON ELLIS and HARRY M. WEBER, citizens of the United States, and residents, respectively, of Montclair, in the county of Essex and State of New Jersey, and Bloomfield, in the county of Essex and State of New Jersey, have invented certain new and useful Improvements in Processes of Making Artificial Resins, of which the following is a specification.

This invention relates to a process of making certain resinous substances which have low acid numbers and which may be used in the manufacture of varnishes, especially grinding varnishes where basic pigments are employed and where it is desirable to avoid the difficulties from solidifying, thickening or so-called livering which occurs when ordinary resins of high acid number are used.

The invention involves in one feature at least the reaction of the lime, magnesia or other compound of the resin with a reagent such as glycerin to produce a composite or complex resinous product.

For example ordinary rosin may be treated with quick lime to form a resinate of lime and this treated with glycerin to yield the composite of low acid number. In one case 300 parts of ordinary rosin was treated with 12 parts by weight of quick lime, the mixture being heated at 290° C. for a half hour. 40 parts of glycerin was then added and the temperature of the resinate held between 270–290° C. for a half hour with agitation when a product having an acid number of 9 was obtained. The product had a satisfactory degree of hardness.

Likewise calcium cyanamid may be used for reaction with the resin in the first instance or for making a hardened product without subsequent treatment with glycerin. For example 200 parts by weight of ordinary rosin was treated with 10 parts of calcium cyanamid for a half hour and then treated with 16 parts of glycerin for a half hour at a temperature between 270–290° C. This afforded a product having the very desirable acid number of 5. In a similar manner magnesia, barium oxid or other base may be used as a means of forming a resinate which may then be reacted upon with glycerin, glycol or other reagent of this character to form the resinous complex desired.

A product may be obtained by reacting on rosin or other resins with chlorhydrin which product has a reduced acid number. For example 100 parts by weight of rosin was heated with 50 parts of chlorhydrin at the boiling point of the mixture the heating being carried on for two hours under a reflux condenser. The chlorhydrin was obtained by treating oil gas with hypochlorous acid and was a mixture of the ethylene and propylene chlorhydrins. This treatment reduced the original acid number from its original point of 161 down to 113. On boiling for a further period of 8 hours the acid number dropped to 19. This produced a soft resin having an excess of chlorhydrin and the product was distilled to remove the excess of the reagent. Distillate came over between 120–140° C. After this distillation the acid number of the resin was 57. The resin obtained in this manner was easily soluble in alcohol and was light in color.

In carrying out this method on the resinate for example lime resinate prepared as above may be boiled with the chlorhydrin to bring about suitable reaction.

In making the esters of fossil resins such for example as that of pontianak, manila and particularly congo resin or gum the fossil resin may first be treated with lime or other basic material capable of forming a resinate and the latter then heated with glycerin or glycol, etc., to produce the complex desired. A more desirable complex however is obtained by reacting upon copal and ordinary rosin, either in admixture as such or in the form of their resinates with glycerin. For example 4 or 5 parts of congo gum with 1 or 2 parts of ordinary rosin are melted and are heated at about 300–310° C. in order to convert the congo gum into a soluble fusible product. Glycerin is then introduced and the reaction allowed to progress until the acid number of the composition has fallen to approximately 10.

When fossil resins are heated to render them suitable for varnish purposes they do not fuse readily but have to be heated to quite a high temperature for a considerable period in order to obtain a fusible product. For example congo gum when heated and stirred will gather into a gummy mass which is extremely difficult to manipulate. If however, the congo gum is heated with 10% or more of ordinary rosin the heating goes on smoothly and agitation may be used advantageously. Moreover the rosin itself is hardened by the heating and more or less blended with the congo gum so that a mixture of the fossil resin and the ordinary rosin is obtained which is of a very intimate character and in fact possibly there may have been some combination between the two resins during the heating operation. In any event this combination, mixture or compound when heated to the point that it is readily fusible is in condition for treatment with glycerin to form the complex desired, namely the congo resin and rosin compound of glycerin, or on the other hand the congo and rosin, lime resinate or other resinate complex with glycerin.

The formation of this product may be carried out at atmospheric pressure in a closed kettle fitted with an agitator. The kettle and agitator are preferably coated with glass or enamel so that the acid resins do not come in contact with metals which would discolor them. A vent is provided for the elimination of steam formed during the reaction. Preferably this takes the form of an air condenser of such length that glycerin which may be volatized is returned to the kettle. The temperature of the operation is generally in the neighborhood of 290° C. but may vary between 270–290° C. or even more under some conditions.

In carrying out the reaction in glass, enamel or porcelain lined vessels with agitation a very light colored product may be secured having a desirably low acid number.

A further step which may be adopted in some cases is that of extraction of the finished product with alcohol or similar solvent thus removing acid resin but leaving undissolved the neutral complex. Thus a rosin congo complex having an acid number of between 5 and 10 may be pulverized and washed with alcohol to remove the acid resin material thereby reducing the acid number to a very low point.

A modification of the foregoing method of forming the complex is that of first preparing a bath of molten rosin, ordinary rosin or colophony being used; this is preferably prepared in a vessel covered so as to exclude the air and having a vent for the escape of vapors but so arranged that the air does not readily come in contact with the rosin surface. The bath of rosin is heated to around 300° C. and congo resin is added gradually with stirring to form a solution of the congo in the rosin. More and more congo gum may be added until finally a mixture of resins containing more of the fossil resin than ordinary resin is obtained without the formation at any time of coagulum or separated fossil resin. In this way a particularly light colored resin combination may be secured which is eminently suited to form a suitable complex with glycerin.

In place of rosin it is possible also to use previously run congo gum or other run fossil resin, that is one which has been heated to render it fusible and suited for use in the preparation of varnishes. In running fossil resins of this sort care is taken to distil off all oil produced during the process so that no so-called copal oil is present, it being desired to heat the fossil resin with a fusible solid resin in order to bring about fusibility of the original fossil resin under these conditions and to promote reaction as far as possible between two resins. Hence all oily fluxing material is preferably avoided. In like manner the finished product may be introduced into the fusing kettle and the fossil resin projected into a molten bath of the latter. Thus the reaction product of congo gum, ordinary rosin and glycerin producing a fusible product may be used as the molten bath or fluxing agent to dissolve and fuse additional quantities of congo gum.

This is advantageous especially when limited kettle facilities are available as after the completion of the operation with glycerin the kettle may be emptied of say two-thirds or three-fourths of the quantity of material present and fresh fossil resin such as congo gum and other resin desired introduced to bring the contents of the kettle up to the requisite charge. Thus the operation may be carried on continuously with simple inexpensive equipment.

In discharging the finished complex in its highly heated molten condition care should be taken to avoid contact with air or oxygen. The cooling should take place in an atmosphere practically free from oxygen in order to secure the lightest colored product obtainable. For this reason it is best to run the material into a container filled with inert gas such as carbon dioxid or nitrogen and allow the temperature to fall to between 100–150° C. before the resin is actually brought into contact with the air. Thus the batch may be discharged through a cooling coil or pipe arranged to deliver the product to a receiver at a temperature of about 100° C. at which temperature practically no discoloration on exposure to the air will occur.

In some cases benzyl alcohol may be used either alone or with glycerin or glycol to form a different type of resinous complex.

To recapitulate the invention involved herein comprises the treatment of ordinary rosin or fusible resin of the nature of colophony or fossil resin such as pontianak, manila, congo, kauri and other copals with a reagent capable of reducing the acid number to a substantial extent and also one which preferably simultaneously hardens the resin in considerable degree and relates in part to the formation of lime or other resinates and subsequent treatment of these with glycerin or similar reagent to form complexes in which the resin is combined with the lime or other base and with the glycerin, glycol or other similar agent and further relates to the co-treatment of a fossil resin and a fusible resinous body whereby from the infusible fossil resin a fusible resinous mixture is obtained without fluxing agent and the treatment of such resinous mixture or composite with glycerin, glycol or similar reagent to produce highly complex resinous substances having relatively low acid numbers and being capable of being fused and dissolved in linseed and other oils, turpentine and the like to form varnishes or grinding varnishes with basic pigments which do not harden or liver in an objectionable manner. The invention further comprises, in certain phases at least, other details of procedure as noted above and also comprises the product of such process, namely the glycerin reaction product of a mixture of a fossil resin and a fusible resin and the glycerin reaction product of a mixture of resinates of lime or other bases.

In heating an infusible copal resin with a fusible solid resin such as ordinary rosin as stated, a temperature of approximately 300° C. is preferable and in carrying out this heating the kettle, while preferably covered, is preferably also vented so as to allow of the ready escape of the copal oil which is formed or any oils that may be produced by decomposition of the rosin so that the fusible resinous product obtained by this heat treatment is substantially free from any liquid oily material especially hydrocarbons which might tend to reduce the melting point of the product and render it less adapted for final reaction with the glycerin, glycol or similar reagent.

What we claim is:—

1. The process of forming a resinous composition which comprises heating an infusible fossil resin in the presence of a fusible solid resin with glycerin whereby a complex of low acid number is produced.

2. The process of making a resinous composition which comprises heating a copal resin in the presence of a fusible solid resin, in expelling any copal oil formed as rapidly as produced and in treating the fusible resinous composition obtained thereby with glycerin to produce a complex of low acid number.

3. The process of producing a resinous composition which comprises dissolving congo gum in molten rosin at approximately 300° C., heating at this temperature and permitting copal oil to escape and finally reacting upon the composition substantially freed of all oily material with a quantity of glycerin at approximately atmospheric temperature with agitation; whereby a resinous complex of low acid number is obtained.

4. A resinous product comprising the reaction products of fusible copal resin, ordinary rosin and glycerin.

5. A resinous product comprising the product of reaction of congo gum, ordinary rosin and glycerin, said composition being substantially free from copal oil and rosin oil.

CARLETON ELLIS.
HARRY M. WEBER.